US012562858B2

(12) United States Patent
Khoshnevisan et al.

(10) Patent No.: US 12,562,858 B2
(45) Date of Patent: Feb. 24, 2026

(54) DOWNLINK AND UPLINK PROCESSING FOR A COOPERATIVE USER EQUIPMENT

(71) Applicant: QUALCOMM Incorporated, San Diego, CA (US)

(72) Inventors: Mostafa Khoshnevisan, San Diego, CA (US); Aleksandar Damnjanovic, Del Mar, CA (US); Xiaoxia Zhang, San Diego, CA (US); Tao Luo, San Diego, CA (US); Fang Yuan, Beijing (CN); Jing Sun, San Diego, CA (US); Yitao Chen, San Diego, CA (US); Juan Montojo, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 482 days.

(21) Appl. No.: 18/001,549

(22) PCT Filed: Aug. 24, 2020

(86) PCT No.: PCT/CN2020/110726

§ 371 (c)(1),
(2) Date: Apr. 27, 2023

(87) PCT Pub. No.: WO2022/040845

PCT Pub. Date: Mar. 3, 2022

(65) Prior Publication Data

US 2023/0246760 A1     Aug. 3, 2023

(51) Int. Cl.
*H04W 72/51*     (2023.01)
*H04B 7/024*     (2017.01)
(Continued)

(52) U.S. Cl.
CPC ........... *H04L 5/0037* (2013.01); *H04B 7/024* (2013.01); *H04B 7/0628* (2013.01); *H04W 72/51* (2023.01); *H04W 72/20* (2023.01)

(58) Field of Classification Search
None
See application file for complete search history.

(56) References Cited

U.S. PATENT DOCUMENTS

2016/0128123 A1     5/2016   Li
2016/0309529 A1     10/2016  Li
(Continued)

FOREIGN PATENT DOCUMENTS

CN          111264070 A        6/2020
WO          WO-2010073060 A1   7/2010
WO          WO-2016141540 A1   9/2016

OTHER PUBLICATIONS

Supplementary European Search Report—EP20950520—Search Authority—Munich—Apr. 8, 2024 (206968EP).
(Continued)

*Primary Examiner* — Anh Vu H Ly
(74) *Attorney, Agent, or Firm* — Norton Rose Fulbright US LLP

(57) ABSTRACT

Providing downlink and uplink processing is disclosed for a cooperative user equipment (UE) operations. A UE participating in the cooperative UE may determine a processing capability associated with each cooperative operational mode of one or more cooperative operation modes of which the UE is capable. The UE sends a cooperative capability report to a serving base station that includes identification of the one or more capable cooperative operation modes and the processing capability of the UE associated with the each cooperative operation mode. The base station may then configure the UEs based on this capability information. The UEs would receive a cooperative mode configuration mes-
(Continued)

600
Determine a processing capability of a UE associated with each cooperative operational mode of which the UE is capable.

601
Report a cooperative capability report to a serving base station including identification of the capable cooperative operation modes and the processing capability of the UE associated with each cooperative operation mode.

602
Receive a cooperative mode configuration message from the serving base station including configuration of a cooperative operation mode.

603
Conduct cooperative UE communications using the cooperative operation mode according to the processing capability associated with the cooperative operation mode.

sage from the serving base station with the configuration of a cooperative operation mode for the UE. The UE may then conduct cooperative UE communications using the configured mode according to its associated processing capability. Other aspects and features are also claimed and described.

30 Claims, 9 Drawing Sheets

(51) Int. Cl.
| | | |
|---|---|---|
| *H04B 7/06* | (2006.01) | |
| *H04L 5/00* | (2006.01) | |
| H04W 72/20 | (2023.01) | |

(56) References Cited

U.S. PATENT DOCUMENTS

| | | | |
|---|---|---|---|
| 2017/0318615 A1 | 11/2017 | Ou et al. | |
| 2018/0227904 A1 | 8/2018 | Raghunathan et al. | |
| 2020/0259529 A1 | 8/2020 | Wang et al. | |
| 2021/0399770 A1* | 12/2021 | Xu .......................... | H04B 7/024 |
| 2023/0042623 A1* | 2/2023 | Wang ..................... | H04B 7/026 |
| 2023/0078501 A1* | 3/2023 | Wang ................... | H04L 5/0023 |
| | | | 370/252 |
| 2023/0246756 A1* | 8/2023 | Khoshnevisan ......... | H04B 7/26 |
| | | | 370/329 |

OTHER PUBLICATIONS

International Search Report and Written Opinion—PCT/CN2020/110726—ISA/EPO—May 28, 2021 (206968WO1).

* cited by examiner

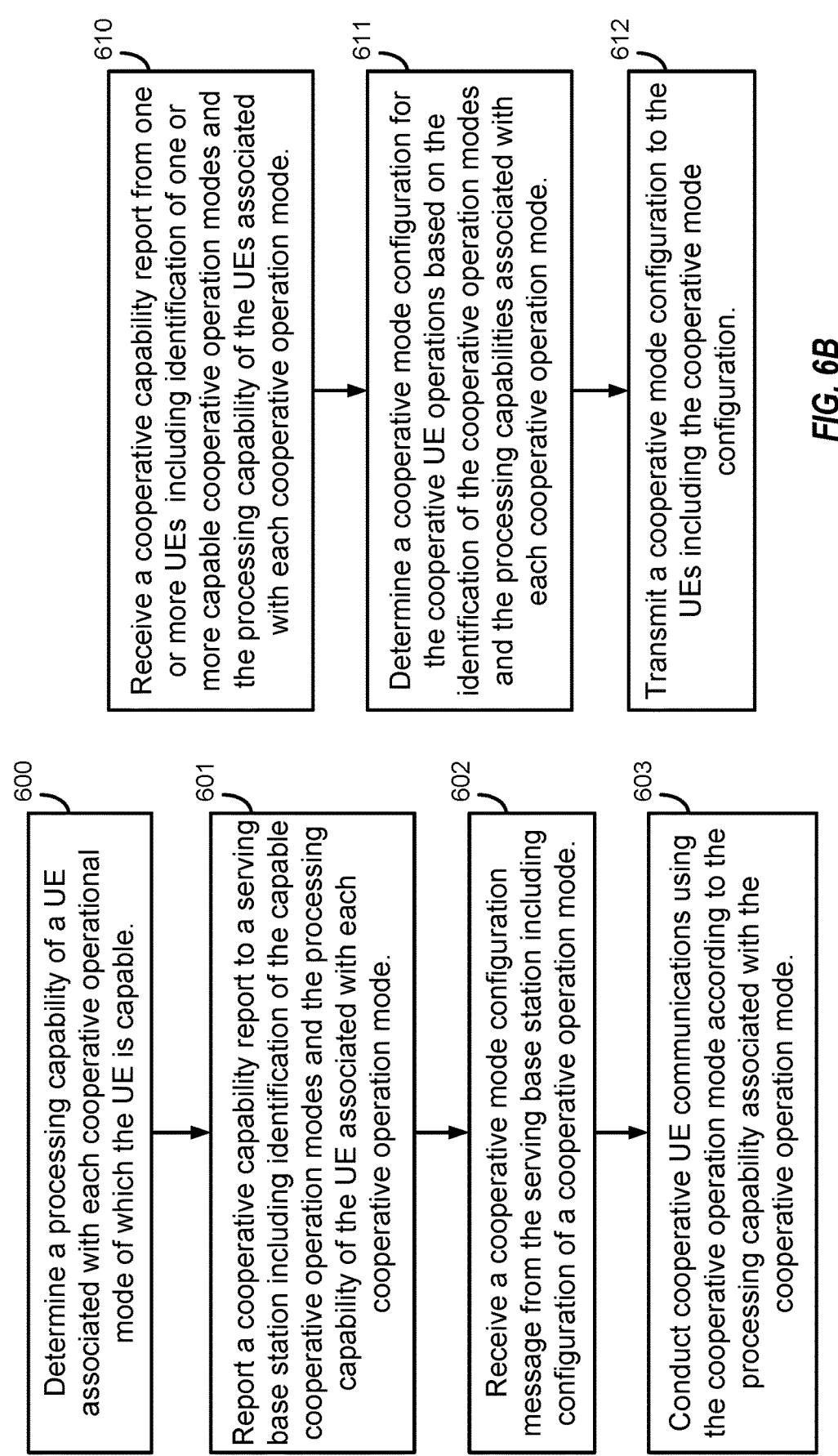

610

Receive a cooperative capability report from one or more UEs including identification of one or more capable cooperative operation modes and the processing capability of the UEs associated with each cooperative operation mode.

611

Determine a cooperative mode configuration for the cooperative UE operations based on the identification of the cooperative operation modes and the processing capabilities associated with each cooperative operation mode.

612

Transmit a cooperative mode configuration to the UEs including the cooperative mode configuration.

Determine a processing capability of a UE associated with each cooperative operational mode of which the UE is capable.

601

Report a cooperative capability report to a serving base station including identification of the capable cooperative operation modes and the processing capability of the UE associated with each cooperative operation mode.

602

Receive a cooperative mode configuration message from the serving base station including configuration of a cooperative operation mode.

603

Conduct cooperative UE communications using the cooperative operation mode according to the processing capability associated with the cooperative operation mode.

*FIG. 6A*

DOWNLINK AND UPLINK PROCESSING FOR A COOPERATIVE USER EQUIPMENT

CROSS-REFERENCE TO RELATED APPLICATIONS

This application claims the benefit of International Patent Application No. PCT/CN2020/110726, entitled, "DOWNLINK AND UPLINK PROCESSING FOR A COOPERATIVE USER EQUIPMENT," filed on Aug. 24, 2020, which is expressly incorporated by reference herein in its entirety.

TECHNICAL FIELD

Aspects of the present disclosure relate generally to wireless communication systems, and more particularly, to wireless communications with cooperative user equipment (UE) operations. Certain aspects of the technology discussed below can enable and provide downlink and uplink processing for a cooperative UE.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, by a UE configured for cooperative UE operation with one or more neighboring UEs, a processing capability of the UE associated with each cooperative operational mode of one or more cooperative operation modes of which the UE is capable, reporting, by the UE, a cooperative capability report to a serving base station, wherein the cooperative capability report includes identification of the one or more cooperative operation mode of which the UE is capable and the processing capability of the UE associated with the each cooperative operation mode, receiving, by the UE, a cooperative mode configuration message from the serving base station, wherein the cooperative mode configuration message includes configuration of a cooperative operation mode for the UE, and conducting, by the UE, cooperative UE communications using the cooperative operation mode according to the processing capability associated with the cooperative operation mode.

In an additional aspect of the disclosure, a method of wireless communication includes receiving, by a base station, a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode, determining, by the base station, a cooperative mode configuration for the cooperative UE operations based on the identification of the one or more cooperative operation modes and the processing capabilities associated with each cooperative operation mode, and transmitting, by the base station, a cooperative mode configuration to the one or more UEs, wherein the cooperative mode configuration message includes the cooperative mode configuration.

In an additional aspect of the disclosure, an apparatus configured for wireless communication includes means for determining, by a UE configured for cooperative UE operation with one or more neighboring UEs, a processing capability of the UE associated with each cooperative operational mode of one or more cooperative operation modes of which the UE is capable, means for reporting, by the UE, a cooperative capability report to a serving base station, wherein the cooperative capability report includes identification of the one or more cooperative operation mode of which the UE is capable and the processing capability of the UE associated with the each cooperative operation mode, means for receiving, by the UE, a cooperative mode configuration message from the serving base station, wherein the cooperative mode configuration message includes configuration of a cooperative operation mode for the UE, and means for conducting, by the UE, cooperative UE communications using the cooperative operation mode according to the processing capability associated with the cooperative operation mode.

In an additional aspect of the disclosure, an apparatus configured for wireless communication includes means for receiving, by a base station, a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode, means for determining, by the base station, a cooperative mode configuration for the cooperative UE operations based on the identification of the one or more cooperative operation modes and the processing capabilities associated with each cooperative operation mode, and means for transmitting, by the base station, a cooperative mode configuration to the one or more UEs, wherein the cooperative mode configuration message includes the cooperative mode configuration.

In an additional aspect of the disclosure, a non-transitory computer-readable medium having program code recorded thereon. The program code further includes code to determine, by a UE configured for cooperative UE operation with one or more neighboring UEs, a processing capability of the UE associated with each cooperative operational mode of one or more cooperative operation modes of which the UE is capable, code to report, by the UE, a cooperative capability report to a serving base station, wherein the cooperative capability report includes identification of the one or more cooperative operation mode of which the UE is capable and the processing capability of the UE associated with the each cooperative operation mode, code to receive, by the UE, a cooperative mode configuration message from the serving base station, wherein the cooperative mode configuration message includes configuration of a cooperative operation mode for the UE, and code to conduct, by the UE, cooperative UE communications using the cooperative operation mode according to the processing capability associated with the cooperative operation mode.

In an additional aspect of the disclosure, a non-transitory computer-readable medium having program code recorded thereon. The program code further includes code to receive, by a base station, a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode, code to determine, by the base station, a cooperative mode configuration for the cooperative UE operations based on the identification of the one or more cooperative operation modes and the processing capabilities associated with each cooperative operation mode, and code to transmit, by the base station, a cooperative mode configuration to the one or more UEs, wherein the cooperative mode configuration message includes the cooperative mode configuration.

In an additional aspect of the disclosure, an apparatus configured for wireless communication is disclosed. The apparatus includes at least one processor, and a memory coupled to the processor. The processor is configured to determine, by a UE configured for cooperative UE operation with one or more neighboring UEs, a processing capability of the UE associated with each cooperative operational mode of one or more cooperative operation modes of which the UE is capable, to report, by the UE, a cooperative capability report to a serving base station, wherein the cooperative capability report includes identification of the one or more cooperative operation mode of which the UE is capable and the processing capability of the UE associated with the each cooperative operation mode, to receive, by the UE, a cooperative mode configuration message from the serving base station, wherein the cooperative mode configuration message includes configuration of a cooperative operation mode for the UE, and to conduct, by the UE, cooperative UE communications using the cooperative operation mode according to the processing capability associated with the cooperative operation mode.

In an additional aspect of the disclosure, an apparatus configured for wireless communication is disclosed. The apparatus includes at least one processor, and a memory coupled to the processor. The processor is configured to receive, by a base station, a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode, to determine, by the base station, a cooperative mode configuration for the cooperative UE operations based on the identification of the one or more cooperative operation modes and the processing capabilities associated with each cooperative operation mode, and to transmit, by the base station, a cooperative mode configuration to the one or more UEs, wherein the cooperative mode configuration message includes the cooperative mode configuration.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 6A-6B are block diagrams illustrating example blocks executed to implement aspects of the present disclosure.

Figure 1:
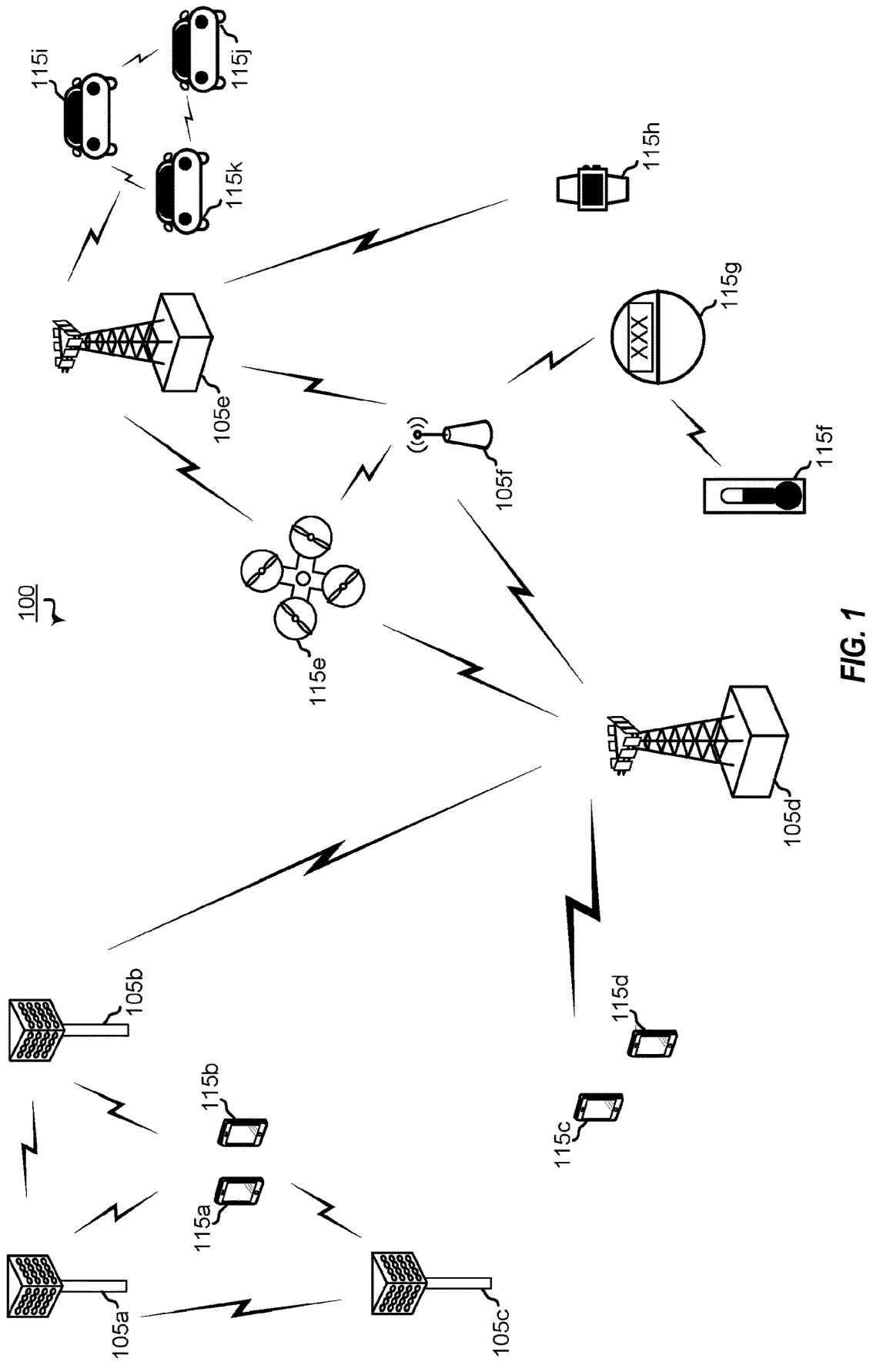
FIG. 1 is a block diagram illustrating details of a wireless communication system according to some embodiments of the present disclosure.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/ small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
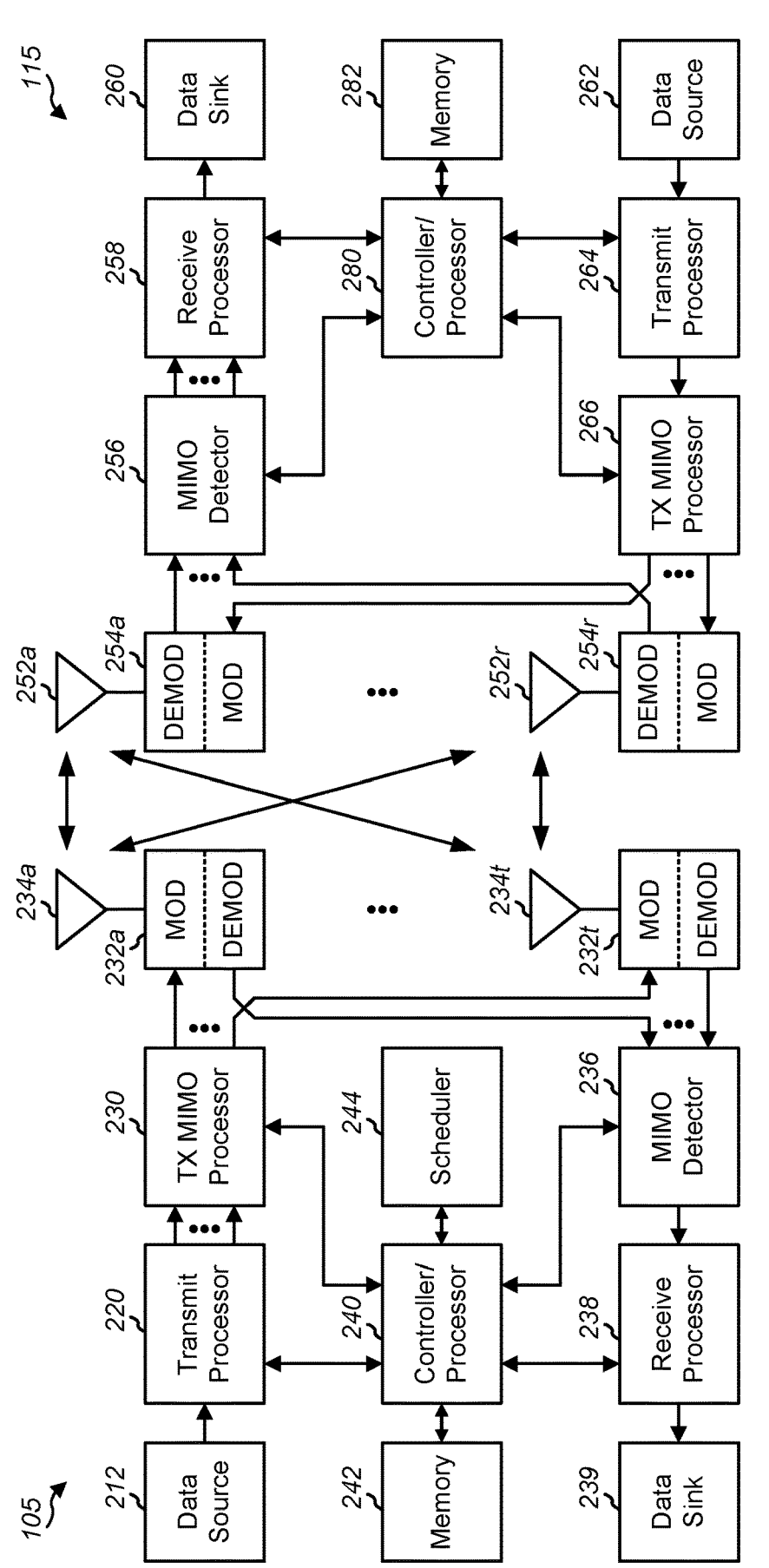
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX)

multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/ processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 6A-6B, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Wireless communication operations using cooperative UEs has been suggested for increasing transmission efficiency. Multiple UEs participating in a cooperative UE operation provides a better aggregate radio frequency (RF) capability through the distributed antennas of the cooperative UE unit. For the UE form factor, baseband modem capabilities may be higher than its RF capabilities. The UE relays of the cooperative UE unit allow creation of a virtual UE with a larger number of antennas, which can then be exploited to increase user experience the over cellular network. Such distributed antennas may create a virtual multiple input, multiple output (MIMO) effect, where the virtual, cooperative UE uses a larger effective number of antennas. Such higher RF capability may be experienced widely over different communication frequencies, such as sub-7 GHz as well as in the millimeter wave (mmW) frequency bands.

Figure 3:
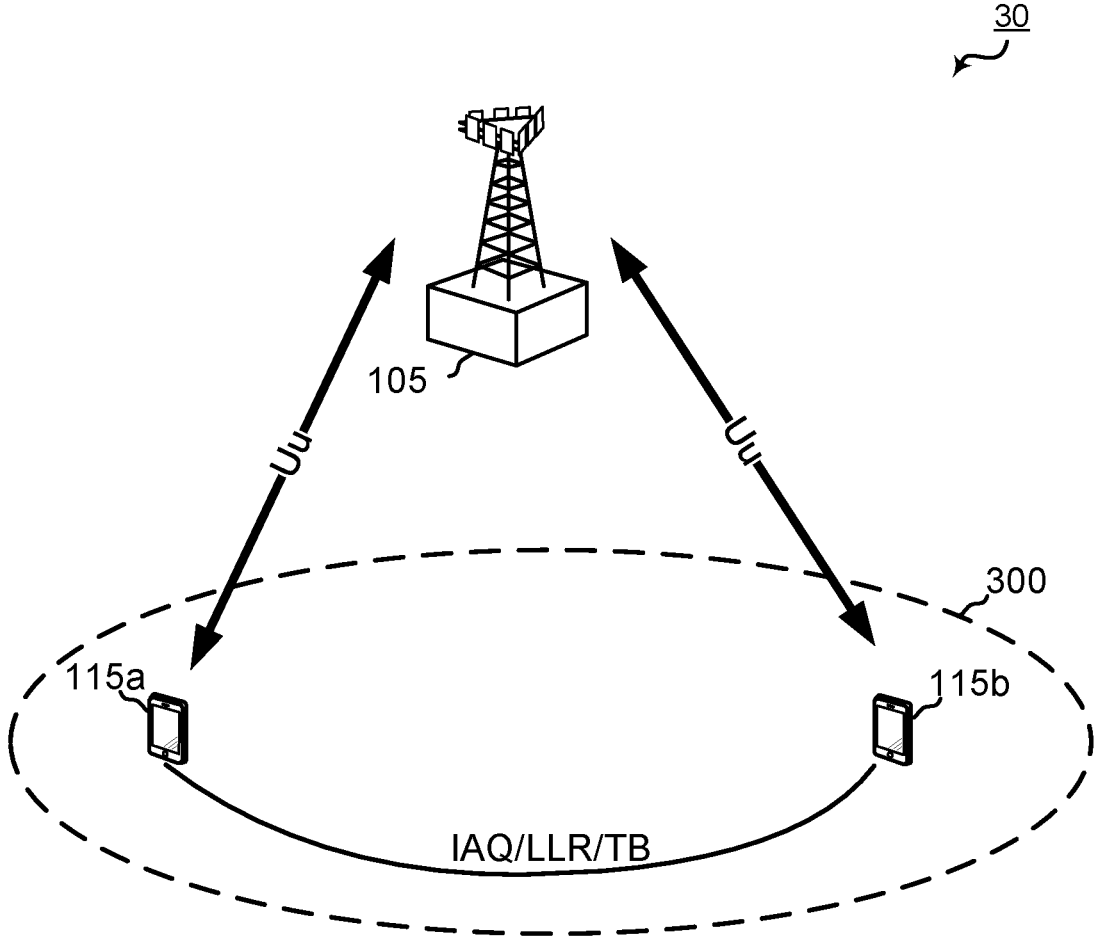
FIG. 3 is a block diagram illustrating cooperative UE operations within a wireless network.

FIG. 3 is a block diagram illustrating a wireless network 30 configured for communication between a base station 105 and a cooperative UE unit 300 made up of cooperating UEs, UEs 115a-115b. In order to form cooperative UE unit 300 with joint baseband processing across distributed antennas from different individual UEs, UEs 115a-115b, that belong to the cooperative UE unit 300, UEs within cooperative UE unit 300 may communicate information regarding received signaling to the primary UE, UE 115a, of the unit. Such information may be referred to herein as cooperative process data. In one example, cooperative process data may be configured for an in-phase and quadrature (IAQ) exchange where a secondary UE, UE 115b, of cooperative UE unit 300 transmits the received signals, before or after applying a transform (e.g., fast Fourier transform (FFT)), but before demodulation or de-mapping, to primary UE 115a. Primary UE 115a may then perform joint demodulation or demapping and decoding. Alternatively, cooperative process data may be configured as a log-likelihood ratio (LLR) exchange where secondary UE 115b transmits LLR values after demodulation or demapping of the received signals to primary UE 115a. Primary UE 115a may then perform joint decoding using the LLR values from secondary UE 115b.

Alternatively, cooperative UE unit 300 may be formed with separate BB processing across UEs 115a-115b. In such separate BB processing, base station 105 sends a cooperative transmission of a TB to UE 115a and UE 115b. UE 115b, after decoding the TB, will transmits an encoded copy of the decoded TB to UE 115a. UE 115a may then separately decodes both TBs received from base station 105 and from UE 115b.

It should be noted that the communication of the cooperative process data between the UEs of a cooperative UE unit may occur using various technologies, such as via a sidelink transmission, shorter-range wireless technology (e.g., WiFi, Bluetooth®, etc.). The various aspects of the present disclosure may be applicable to cooperative UE operations which use any variety of UE-to-UE communication methods.

The IAQ and LLR options for cooperative process data may use different levels of overhead for cooperative UE operations. Such overhead is provided below in Table 1.

TABLE 1

| | Use Case | Overhead |
|---|---|---|
| IAQ | Distributed MIMO: UE 115a may have limited RF capabilities but enhanced baseband processing capability. | $N_{RE}*N_{Rx}*2*N_{quant}$ |
| LLR (for downlink) | Distributed Computing: UE 115a may have limited RF and baseband processing capabilities. UE 115b sends LLRs to UE 115a after channel estimation and demodulation. | $N_{REdata}*N_{Layer}*N_{Mod}*N_{quant}$ |

According to Table 1, an IAQ exchange configuration for cooperative process data may implement a distributed MIMO functionality where the primary UE, UE 115a, may have limited RF capabilities, in which the secondary UE, UE 115b, provides distributed antennas for receiving the cooperative transmission and communicates to the primary UE, UE 115a, the IAQ information of the pre-demodulated received cooperative transmission. In such use case, UE 115a may have enhanced baseband processing capabilities, thus, UE 115a uses the cooperative transmission transmitted directly to UE 115a from base station 105 and the IAQ information of the pre-demodulated received cooperative transmission to jointly demodulate what results in a higher-order MIMO transmission.

The overhead for the IAQ exchange configuration includes the number of resource elements of the transmission, including DMRS, $N_{RE}$, the number of receive antennas at the receiving UE, $N_{Rx}$, multiplied by 2 because of the in-phase (I) and quadrature (Q) components of the IAQ information, and the quantization factor for quantizing the I and Q components, $N_{quant}$.

The LLR exchange configuration for cooperative process data, according to Table 1, may implement a distributed computing functionality where the primary UE, UE 115a, may have both limited RF capabilities and limited baseband processing capabilities. In such distributed computing functionality, the secondary UE, UE 115b, provides both the distributed antennas and additional processing capabilities to both receive the cooperative transmission transmitted to UE 115b and demodulating the received cooperative transmission. UE 115b may then calculate the LLR values on the coded symbols of the demodulated received cooperative transmission. UE 115b sends these LLR values to UE 115a. The primary UE, UE 115a, demodulates the received cooperative transmission directly transmitted to UE 115a by base station 105, calculates its own LLR values on the codded symbols after demodulation and then jointly decodes the coded symbols using its own LLR values and the LLR values from the secondary UE, UE 115b.

The overhead for the LLR exchange configuration includes the number of resource elements of the data transmission, $N_{RE\_data}$, the number of layers available for processing at UE 115a, $N_{Layer}$, the modulation order, $N_{Mod}$, and the LLR quantization value, $N_{quant}$, which, for the LLR exchange, can be smaller than $N_{quant}$ for IAQ exchange because of the sensitivity of the LLR values is typically less than for IAQ.

Existing standards provide for a UE processing time of $N_1+d_{1,1}$ symbols between the last symbol of a downlink transmission (e.g., PDSCH) and the first symbol of an uplink transmission (e.g., PUCCH) that carries an acknowledgement signal (e.g., hybrid automatic receipt request (HARQ)-acknowledgement (Ack)) corresponding to the downlink transmission. This processing time does not necessarily identify where such an uplink transmission is made, but the earliest time after the downlink transmission available for the UE to transmit. The variable, $N_1$, depends on the UE capability (e.g., processing Capability ½, Table 1/Table 2, below), subcarrier spacing (SCS), and whether additional DMRS symbols are configured (e.g., Capability 1).

TABLE 1

| | Capability 1: PDSCH Decoding Time $N_1$ [symbols] | |
|---|---|---|
| SCS: μ | The additional position for DMRS is position_0 in the DMRS configuration for both DMRS mapping type A and mapping type B | The additional position for DMRS is not position_0 in the DMRS configuration for either DMRS mapping type A and mapping type B, or if the higher layer parameter is not configured |
| 0 | 8 | $N_{1,0}$ |
| 1 | 10 | 13 |

TABLE 1-continued

| | Capability 1: PDSCH Decoding Time $N_1$ [symbols] | |
|---|---|---|
| SCS: $\mu$ | The additional position for DMRS is position_0 in the DMRS configuration for both DMRS mapping type A and mapping type B | The additional position for DMRS is not position_0 in the DMRS configuration for either DMRS mapping type A and mapping type B, or if the higher layer parameter is not configured |
| 2 | 17 | 20 |
| 3 | 20 | 24 |

TABLE 2

| SCS: $\mu$ | Capability 2: PDSCH Decoding Time $N_1$ [symbols] |
|---|---|
| 0 | 3 |
| 1 | 4.5 |
| 2 | 9 for frequency range 1 (FR1) |

The variable, $d_{1,1}$, is an additional processing time that depends on configuration of the PDSCH mapping type A or B, the UE processing Capability 1 or 2 (Table 1/Table 2), PDSCH length (L), and the number of overlapping symbols of the scheduling PDCCH and the scheduled PDSCH. It should be noted that $N_1+d_{1,1}$ symbols after end of the downlink transmission (e.g., PDSCH) includes the time for decoding the DCI scheduling the downlink transmission, receiving the downlink transmission, including channel estimation and demodulation, decoding the TB, and preparing HARQ-Ack payload to transmit on the uplink transmission (e.g., PUCCH).

On the uplink side, the existing standards further provide for a UE processing time of $N_2+d_{2,1}$ symbols between the last symbol of downlink control signal (e.g., PDCCH) that schedules the uplink transmission (e.g., PUSCH) and the first symbol of the uplink transmission (e.g., PUSCH). Again, the processing time, $N_2+d_{2,1}$, does not necessarily identify where the uplink transmission is scheduled, but the earliest time that it can be scheduled. $N_2$ depends on UE processing capability (e.g., Capability 1/2), and the subcarrier spacing, while $d_{2,1}$ is an additional processing time that depends on whether the first symbol of the uplink transmission includes DMRS only or not. It should be noted that $N_2+d_{2,1}$ symbols after end of the downlink control signal (e.g., PDCCH) includes the time for decoding the DCI and preparing the uplink transmission.

Enabling cooperative UE operations may impact the downlink transmission processing timeline, depending on whether joint baseband processing or separate baseband processing is used. Consider a cooperative UE unit including a primary UE, UE1, and a secondary UE, UE2. For joint BB processing, the amount of disruption to the processing timeline may depend on whether the cooperative process data is configured for IAQ exchange or LLR exchange. For separate BB processing, the disruption may depend on whether a HARQ-Ack corresponding to the TB is transmitted separately to the base station for the TB received at UE1 from the base station and to UE2 for the TB received at UE1 from UE2, or whether the HARQ-Ack is always transmitted to the base station over the Uu interface even if the copy of the TB received at UE1 from UE2 is decoded. The disruption to the processing time may further depend on the UE-to-UE communication delay and over-the-air (OTA)

interface, and on whether any pipelining is performed at UE or how the joint baseband processing is done.

Figure 4A:
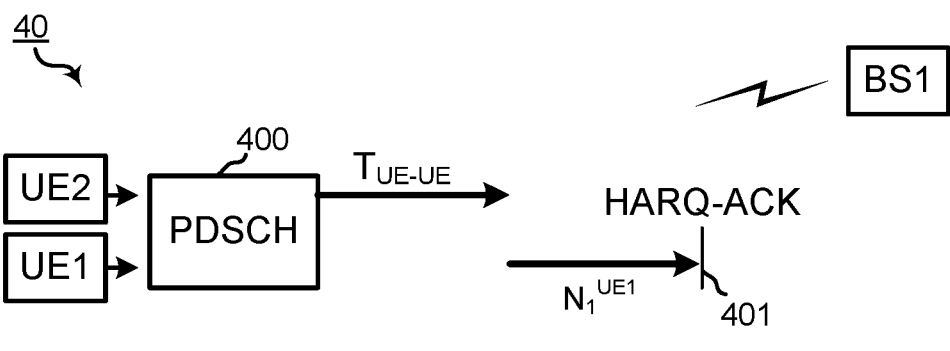
FIGS. 4A-4C are block diagrams illustrating the joint baseband processing characteristics for IAQ and LLR exchange within cooperative UE operations.
Figure 4B:
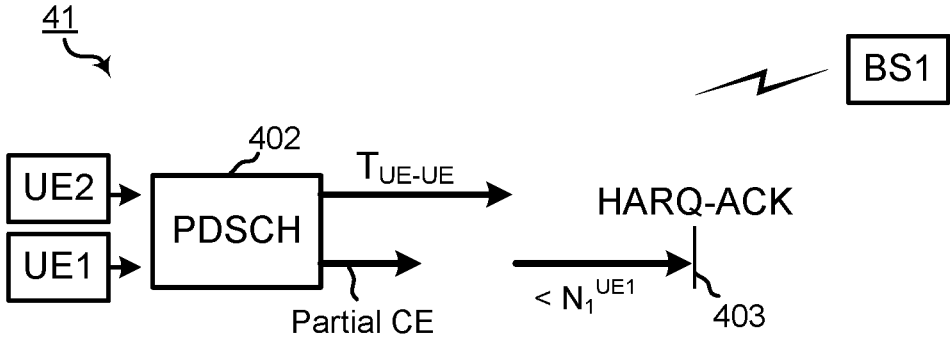
Figure 4C:
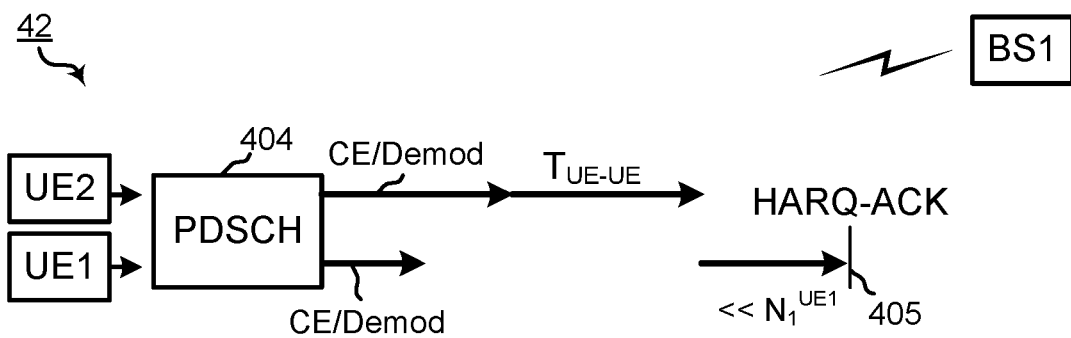

FIGS. 4A-4C are block diagrams illustrating a processing timeline for cooperative UE operations with joint baseband processing between UE1, UE2, and base state, BS1. In general, the combined processing time for cooperative UE operations using joint baseband processing may depend on the processing capabilities of the individual UEs in the cooperative UE unit, the UE-to-UE communication time/delay, and the level of joint baseband processing at UE1 and UE2, $N_1^{UE1}$, $N_1^{UE2}$. The UE-to-UE communication time, $T_{UE\text{-}UE}$, includes the time for encoding the packet by source UE, the OTA interface time, and the time for decoding the packet by the target UE. The UE-to-UE communication time may also depend on the communication technology used (e.g., device-to-device PC5 interface ("sidelink")/WiFi/Bluetooth®, etc.), whether the packet includes IAQ or LLR information, and whether some level of pipelining is possible and used at the target UE.

A cooperative UE operation 40 illustrated in FIG. 4A includes UE1 and UE2 configured for IAQ exchange. BS1 transmits a transport block (TB) in PDSCH 400 in cooperative transmissions to both UE1 and UE2. At the secondary UE, UE2 receives the cooperative transmission and, either before or after applying a transform (e.g., FFT), UE2 communicates the IAQ cooperative process data over a time, $T_{UE\text{-}UE}$. As noted above, $T_{UE\text{-}UE}$ includes the time for UE2 to encode the packet, the OTA interface time, and the time for UE1 to decode the packet. UE1 performs the joint baseband processing, $N_1^{UE1}$, including jointly demodulating the received signal of PDSCH 400, and then decodes the demodulated signal to receive the transmitted TB. UE1 is then available to transmit HARQ-ACK at 401.

A cooperative UE operation 41 illustrated in FIG. 4B includes UE1 and UE2 configured for IAQ exchange, where UE1 includes the capability for pipeline partial calculation of the channel estimate. BS1 transmits a TB in PDSCH 402 in cooperative transmissions to UE1 and UE2. UE2 receives the cooperative transmission and communicates the IAQ cooperative process data over the UE-to-UE communication time, $T_{UE\text{-}UE}$. While UE2 is performing the actions within $T_{UE\text{-}UE}$, UE1 performs some pipelining with the partial calculation of the channel estimate. Decoding the IAQ cooperative process data, UE1 performs the joint baseband processing. However, because UE1 pipelined partial calculation of the channel estimate, the joint baseband processing time, may be less than $N_1^{UE1}$. UE1 is then available to transmit HARQ-ACK at 403. The example implementation illustrated in FIG. 4B reduces the total time between the end of the downlink transmission, PDSCH 402, and the first symbol when UE1 is available to transmit the HARQ-ACK.

A cooperative UE operation 42 illustrated in FIG. 4C includes UE1 and UE2 configured for LLR exchange. BS1 transmits a TB in PDSCH 404 in cooperative transmissions to UE1 and UE2. The LLR exchange option pushes some processing to UE2. Therefore, on receipt of the cooperative transmission of PDSCH 404, UE2 calculates the channel estimate and demodulates the cooperative transmission. UE2 calculates the LLR values from the coded symbols of the demodulated transmission and then communicates the LLR values to UE1 over the UE-to-UE communication time, $T_{UE\text{-}UE}$. While UE2 is processing and communicating the signals, UE1 also calculates the channel estimate and demodulates the received cooperative transmission. It should be noted that the UE processing capabilities of UE1 and UE2 may be different, resulting in a different processing time to calculate the channel estimate and demodulate the signal, as shown in FIG. 4C.

After UE1 decodes the packet in the LLR exchange from UE2, it begins the joint baseband processing through joint decoding of the demodulated data using the LLR values from UE2 and LLR values UE1 calculates after demodulating the received cooperative transmission. Because the joint baseband processing at UE1 does not include channel estimation or demodulation, the time for UE1 to complete this processing is much less than $N_1^{UE1}$. UE1 is then available to transmit HARQ-ACK at 405.

Figure 5A:
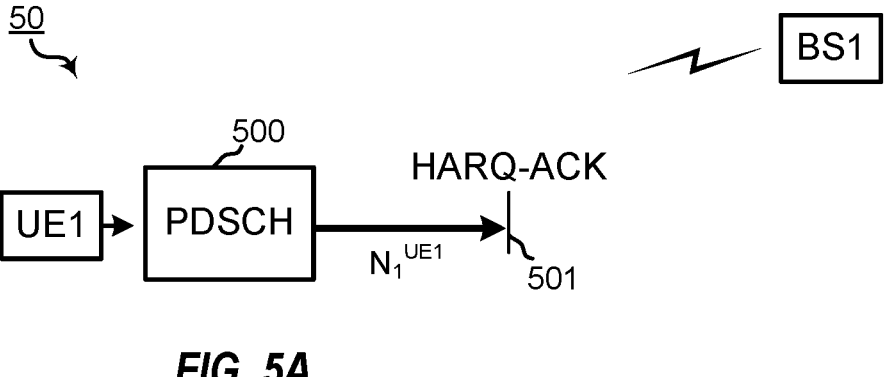
FIGS. 5A-5B are block diagrams illustrating the separate baseband processing characteristics for IAQ and LLR exchange within cooperative UE operations.
Figure 5B:
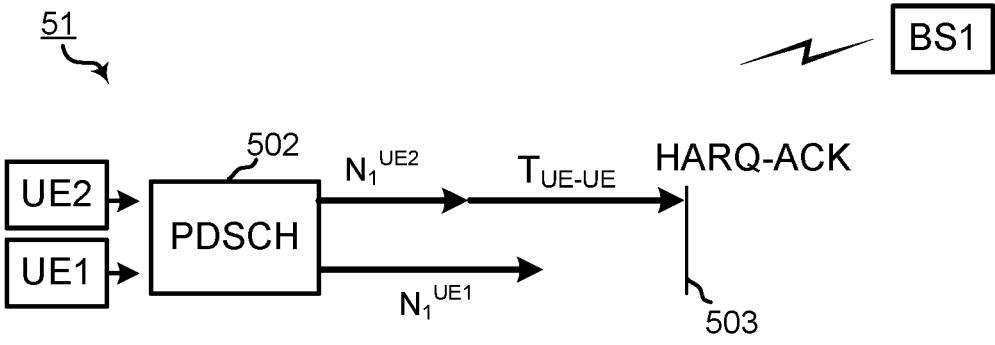

FIGS. 5A-5B are block diagrams illustrating a processing timeline for cooperative UE operations with separate baseband processing between UE1, UE2, and base state, BS1. In general, the combined processing time for cooperative UE operations using separate baseband processing may depend on processing capability of individual UEs, UE-UE communication time, and the separate BB processing, $N_1^{UE1}$, $N_1^{UE2}$, and the configuration for HARQ-ACK transmission. As noted in the joint baseband processing implementations illustrated in FIGS. 4A-4C, the UE-to-UE processing time, $T_{UE-UE}$, includes the time for encoding the packet by the source UE, the OTA interface time, and the time for decoding the packet by target UE. As with the joint baseband processing examples, it may also depend on the technology used for the UE-to-UE communication (e.g., device-to-device PC5 interface ("sidelink")/WiFi/Bluetooth®, etc.), and whether the HARQ-ACK configuration provides for the primary UE to transmit HARQ-ACK independently to the base station when the TB is decoded irrespective of the TB transmitted from the secondary UE over the UE-to-UE communication.

A cooperative UE operation 50 illustrated in FIG. 5A includes UE1 configured for independent HARQ-ACK transmission. Because UE1 is configured to transmit HARQ-ACK independently, the operations of UE2 (not shown) will not affect the operations of UE1. BS1 transmits a TB in PDSCH 500. UE1 performs separate processing on the received cooperative transmission, $N_1^{UE1}$. The separate processing demodulates and decodes the received cooperative transmission for the transmitted TB. As soon as UE1 completes its processing, at 501, UE1 is available to transmit HARQ-ACK, regardless of whether UE1 receives the coded TB from UE2 (not shown).

A cooperative UE operation 51 illustrated in FIG. 5B includes UE1 and UE2 configured for dependent HARQ-ACK transmission. Thus, UE1 is not available for HARQ-ACK transmission until 503, after UE1 finishes its independent processing, $N_1^{UE1}$, UE2 finishes its independent processing, $N_1^{UE2}$, and UE2 communicates the coded TB to UE1 over UE-to-UE communications, $T_{UE-UE}$. Thus, from the point of view of UE1, the HARQ-ACK from UE1 to BS1 takes into account both whether the TB from BS1 to UE1 is decoded or not, and whether the TB from UE2 to UE1 is decoded or not.

When the cooperative process data is configured for IAQ exchange in the joint baseband processing operations, the processing time at UE1 may be larger than $N_1^{UE1}$ given that there are essentially more MIMO layers to demodulate. For example, operating as an individual UE, UE1 has limited RF capability and, as a result, a maximum number of MIMO layers available for processing (e.g, 4). In a cooperative UE operation configured with IAQ exchange, UE1 demodulates twice the MIMO layers (e.g., 8), which means that the increased MIMO layer processing time, $N_1^{UE1'}$, is greater than the individual processing time, $N_1^{UE1}$, ($N_1^{UE1'}$>$N_1^{UE1}$).

On the uplink side, the processing time may cause less of an impact on the cooperative UE operation. Assuming an uplink TB is available at both individual UEs, there would be separate encoding, and the uplink grant may become available at the same time (e.g., decoded separately by the individual UEs). In such a scenario, the uplink processing time can be determined as a maximum between the processing times of the two individual UEs, $Max(N_1^{UE1}, N_1^{UE2})$ Otherwise, it may become similar to the case of downlink processing time, where the total processing time also depends on the UE-to-UE processing time, $T_{UE-UE}$, and the other implementation details of the cooperative UE operation.

Overall, it may be difficult for the network to determine an impact on the processing time, based on individual UE processing capabilities, even if $N_1^{UE1}$, $N_1^{UE2}$, $T_{UE-UE}$ are known. A more modular/granular UE processing capability may be beneficial. According to the various aspect herein, a UE participating in a cooperative UE unit may directly indicate the number of symbols used for downlink or uplink processing for different subcarrier spacing (SCS). Ths value may be time-varying and can change depending on UEs participating in the cooperative UE unit. Such time-varying changes may be addressed by a dynamic UE capability framework according to aspects of the present disclosure.

Figure 8:
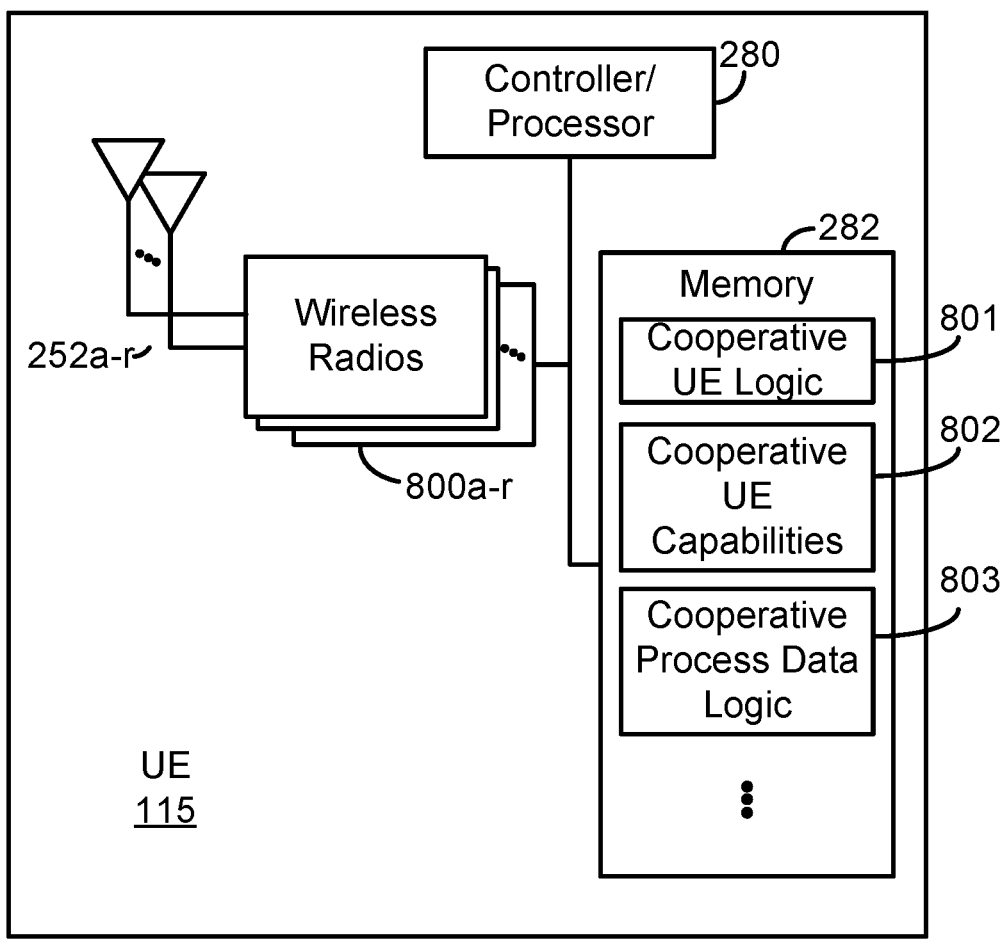
FIG. 8 is a block diagram illustrating an example implementation of a UE configured according to one aspect of the present disclosure.

FIG. 6A is a block diagram illustrating example blocks executed to implement one aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 600, a UE determines a processing capability of the UE associated with each cooperative operational mode of one or more cooperative operation modes of which the UE is capable. A UE, such as UE 115, executes, under control of controller/processor 280, cooperative UE logic 801, stored in memory 282. The functionality and processes enabled through execution of the instructions of cooperative UE logic 801 (referred to herein as the "execution environment" of cooperative UE logic 801) provides UE 115 with the functionality to cooperative with neighboring UEs to create a cooperative UE unit. Within the execution environment of cooperative UE logic 801, UE 115 gathers its individual capabilities and, alternatively, the combined capabilities of the logical entity of the cooperative UE unit, which includes the capabilities of the other UEs in the cooperative UE unit. These capabilities are stored in memory 282 at cooperative UE capabilities 802.

At block 601, the UE reports a cooperative capability report to a serving base station, wherein the cooperative capability report includes identification of the one or more cooperative operation mode of which the UE is capable and the processing capability of the UE associated with the each cooperative operation mode. UE 115, within the execution environment of cooperative UE logic 801, creates a cooperative capabilities report and transmits this report to a serving base station via wireless radios 800*a-r* and antennas 252*a-r*.

At block 602, the UE receives a cooperative mode configuration message from the serving base station, wherein the cooperative mode configuration message includes configuration of a cooperative operation mode for the UE. The serving base station uses the capabilities report to configure the UEs of the cooperative UE unit with cooperative mode and the related processing capabilities. UE 115 receives such configuration through the cooperative mode configuration message from the serving base station via antennas 252*a-r* and wireless radios 800*a-r*.

At block 603, the UE conducts cooperative UE communications using the cooperative operation mode according to the processing capability associated with the cooperative operation mode. The execution environment of cooperative UE logic 802 uses this configuration information to configure the available modes and processing capability for cooperative UE operations.

Figure 9:
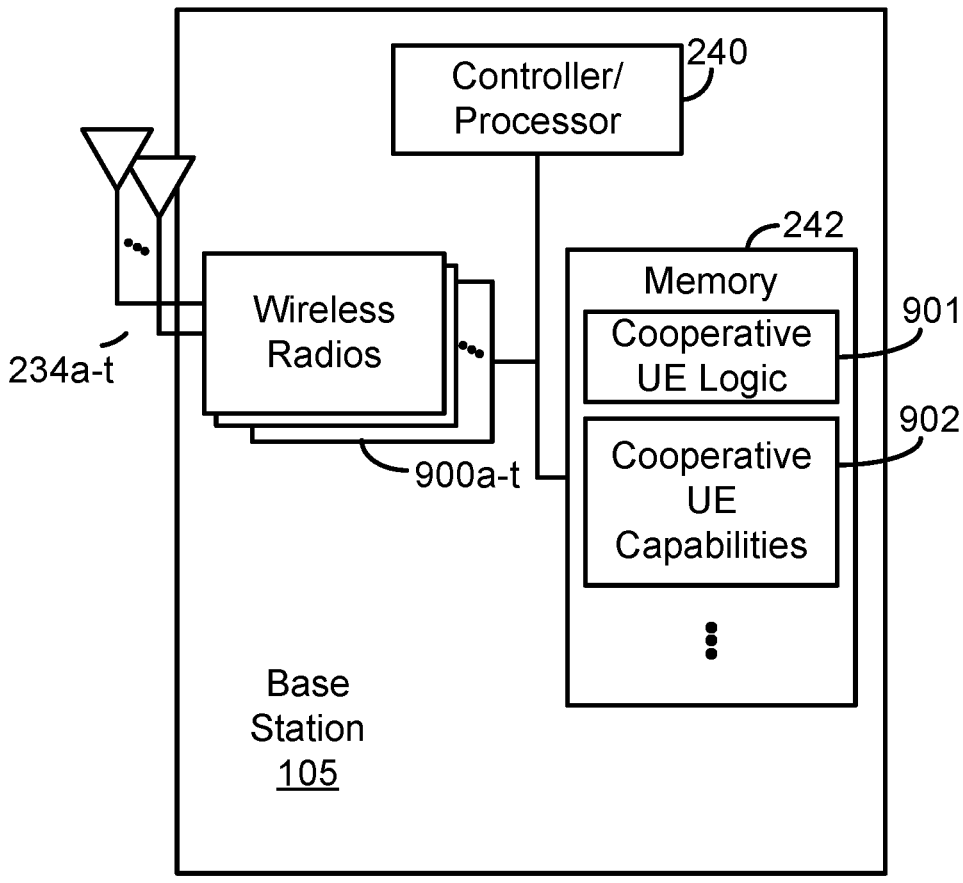
FIG. 9 is a block diagram illustrating an example implementation of a base station configured according to one aspect of the present disclosure.

FIG. 6B is a block diagram illustrating example blocks executed to implement one aspect of the present disclosure. The example blocks will also be described with respect to base station 105 as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 900*a-t* and antennas 234*a-t*. Wireless radios 900*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 610, a base station receives a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode. A base station, such as base station 105, executes, under control of controller/processor 240, cooperative UE logic 901, stored in memory 242. The functionality and processes enabled through execution of the instructions of cooperative UE logic 901 (referred to herein as the "execution environment" of cooperative UE logic 901) provides base station 105 with the functionality to manage several UEs as a cooperative UE unit. Within the execution environment of cooperative UE logic 901, base station 105 receives a cooperative capability report from one or more UEs of a cooperative UE unit and stores such capabilities in memory 242 at cooperative UE capabilities 902.

At block 611, the base station determines a cooperative mode configuration for the cooperative UE operations based on the identification of the one or more cooperative operation modes and the processing capabilities associated with each cooperative operation mode. Within the execution environment of cooperative UE logic 901, base station 105 determines the appropriate mode and processing configuration of the cooperative UE unit.

At block 612, the base station transmits, a cooperative mode configuration to the one or more UEs, wherein the cooperative mode configuration message includes the cooperative mode configuration. Within the execution environment of cooperative UE logic 901, base station 105 generates a cooperative mode configuration message and transmits the configuration message to the UEs participating in the cooperative UE unit. The configuration message is transmitted to the UEs via wireless radios 900*a-t* and antennas 234*a-t*.

Figure 7:
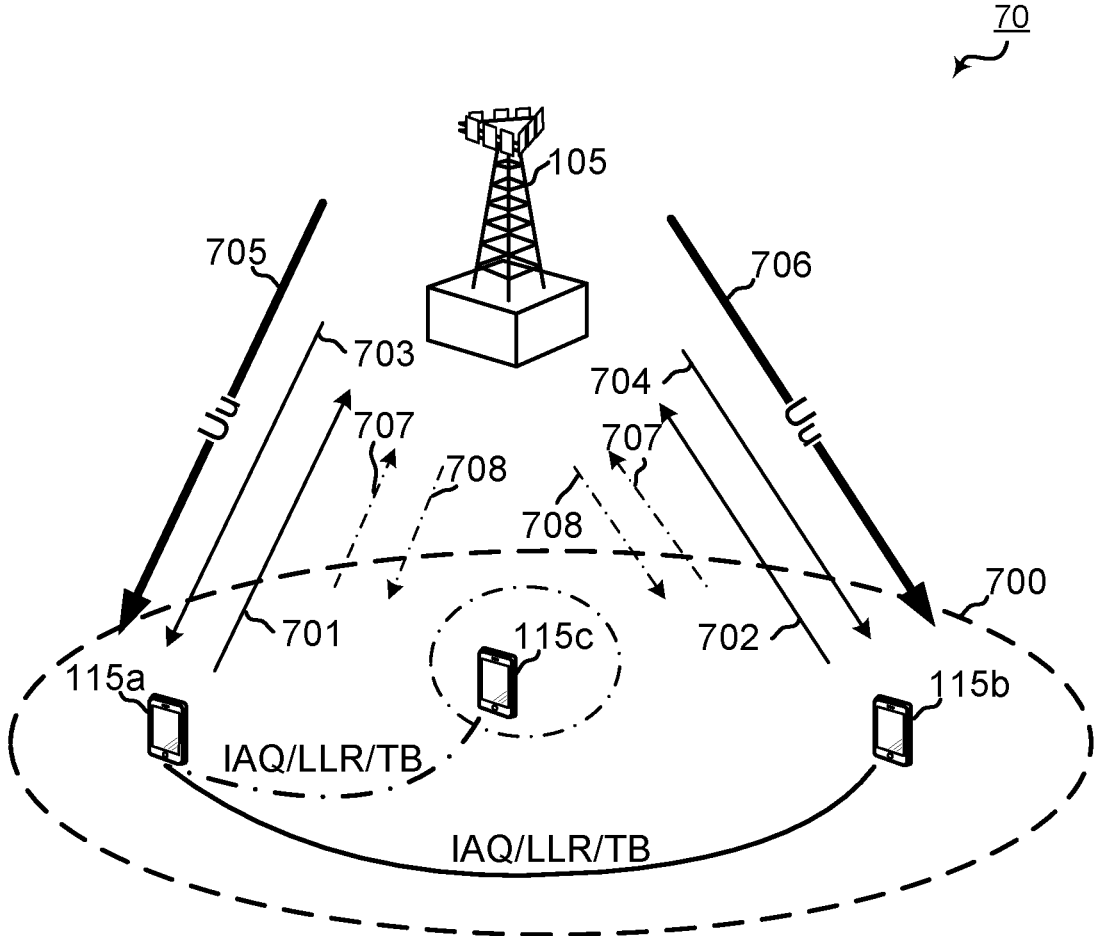
FIG. 7 is a block diagram illustrating a wireless network with UEs and a base station configured for cooperative UE operations according to one aspect of the present disclosure.

FIG. 7 is a block diagram illustrating a wireless network 70 with UEs 115*a*-115*b* and base station 105 configured for cooperative UE operations according to one aspect of the present disclosure. UEs 115*a* and 115*b* participate together in cooperative UE unit 700. According to one aspect of the present disclosure, UEs 115*a* and 115*b* each indicate the support of one or more modes of operations via a cooperative capability report 701 and 702, respectively. Alternatively or additionally, cooperative capability report 701 and 702 may include capability information for the logical entity of cooperative UE unit 700. Such capability information may then report the one or more modes of operation and processing capability of cooperative UE unit 700, which would include the combination of modes and processing capabilities of UEs 115*a* and 115*b*. For joint baseband processing, UEs 115 indicates whether the cooperative process data is configured for IAQ exchange, for LLR exchange, or where both are supported. For separate baseband processing, cooperative capability reports 701 and 702 may further indicate whether the HARQ-ACK transmission configuration for UEs 115*a* and 115*b* are independent or dependent on the UE-to-UE communications of the same TB that is cooperatively communicated across UEs 115*a* and 115*b* of cooperative UE unit 700. For each such identified mode, cooperative capability reports 701 and 702 may also indicate some respective baseband capabilities of UEs 115*a* and 115*b*, such as the maximum rank allowed for the IAQ exchange configuration.

Cooperative capability reports 701 and 702 may also indicate a corresponding PDSCH processing capability of UEs 115*a* and 115*b* for each supported mode. The processing capability may be selected from a predetermined capabilities, such as the 3GPP Rel. 15 Capabilities 1 or 2 (Tables 1 and 2) or may be directly indicated as a number of OFDM symbols for each SCS supported by UE 115*a* or 115*b* for each supported mode. When determining the cooperative UE capabilities for identification in cooperative capability reports 701 and 702, UEs 115*a* and 115*b* may consider the UE-to-UE communication delay, $T_{UE-UE}$, which includes the time for encoding a packet by the source UE, the OTA interface time, and the time for decoding the packet by the target UE, and the baseband processing method used for the decoded packet in a given mode when reporting the corresponding cooperative processing capability. Base station 105 receives the cooperative capability report and uses the reported cooperative processing capabilities of each of UEs 115*a* and 115*b* to configure UEs 115*a* and 115*b* with a given cooperative mode and the corresponding processing capability via cooperative UE configuration messages 703 and 704. Once configured, base station 105 may provide cooperative transmissions 705 and 706 of TBs for UEs 115*a* and 115*b* of cooperative UE unit 700.

Additional aspects of the present disclosure may provide for one or more of UEs 115*a* and 115*b* of cooperative UE unit 700 to dynamically update the processing capability values as the number or type of individual UEs that form cooperative UE unit 700 changes. A time-varying UE capability framework can be used for this purpose, which may be UE-initiated. For example, as UE 115*c* is added to the UEs participating in cooperative UE unit 700, one of UEs 115*a* or 115*b* may signal dynamic processing update 707 to base station 105 to dynamically update the cooperative capability information. For example, dynamic processing update 707 may include an uplink configuration information (UCI) message, when the update includes a small number of bits or a medium access control-control element (MAC-CE) in an uplink transmission of one of UEs 115*a*-115*c* to update UE capabilities more dynamically. Base station 105 may acknowledge the reception of dynamic processing update 707 via update acknowledgement 708 to ensure that both base station 105 and UEs 115*a*-115*c* have the same capability information.

In further aspects of the present disclosure, cooperative capability reports 701 and 702 may indicate the individual processing capabilities of UEs 115*a* and 115*b*, as well as a set of additional parameters (associated with, for example, UE-to-UE communication, the mode of operation, the maximum rank supported by UEs 115*a* and 115*b*, etc.). Using this additional capability information, base station 105 determines the processing capability of the participating UEs, UEs 115*a* and 115*b* (corresponding to the processing capability of the logical entity of cooperative UE unit 700), based on the factors above. Base station 105 may use a specified formula as a function of the individual UE processing capabilities and the additional parameters received via cooperative capability reports 701 and 702. For example, uplink transmission processing capability, may be determined by base station 105 according the formula: $\mathrm{Max}(\mathrm{N}_1^{UE1}, \mathrm{N}_1^{UE2})$, based on the information in cooperative capability reports 701 and 702.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to provide downlink and uplink processing for a cooperative UE may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 6A-6B) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication may include determining, by a UE configured for cooperative UE operation with one or more neighboring UEs, a processing capability of the UE associated with each cooperative operational mode of one or more cooperative operation modes of which the UE is capable; reporting, by the UE, a cooperative capability report to a serving base station, wherein the cooperative capability report includes identification of the one or more cooperative operation mode of which the UE is capable and the processing capability of the UE associated with the each cooperative operation mode; receiving, by the UE, a cooperative mode configuration message from the serving base station, wherein the cooperative mode configuration message includes configuration of a cooperative operation mode for the UE; and conducting, by the UE, cooperative UE communications using the cooperative operation mode according to the processing capability associated with the cooperative operation mode.

A second aspect, based on the first aspect, wherein the one or more cooperative operation modes includes one or more of: a joint baseband processing mode with one of: IAQ exchange or LLR exchange; and a separate baseband processing mode with one of: separate acknowledgement reporting or combined acknowledgement reporting.

A third aspect, based on the second aspect, wherein the cooperative capability report further includes baseband processing capabilities for the joint baseband processing mode.

A fourth aspect, based on the first aspect, wherein the determining the processing capability includes one of: selecting a predefined processing capability of a plurality of predefined processing capabilities, wherein the predefined processing capability is selected as associated with an identified cooperative operation mode; determining a number of symbols used for processing communications for each supported subcarrier spacing of each of the one or more cooperative operational modes identified in the cooperative capability report.

A fifth aspect, based on the fourth aspect, wherein the determining the number of symbols further includes: determining a number of UE-to-UE symbols used for UE-to-UE communication delay, including one or more of: packet encoding time by source UE for target UE, OTA time for UE-to-UE transmission, and packet decoding time by the target UE.

A sixth aspect, based on the first aspect, further including: detecting, by the UE, a change in the processing capability reported in the cooperative capability report; reporting, by the UE, a revised processing capability to the serving base station based on the change detected; and receiving, by the UE, a confirmation message from the serving base station, wherein the configuration messages confirms receipt of the revised processing capability by the serving base station.

A seventh aspect, based on the sixth aspect, wherein the reporting the revised processing capability includes one of:

reporting the revised processing capability in an UCI message; or reporting the revised processing capability in a MAC-CE.

An eighth aspect, based on the sixth aspect, wherein the detecting the change in the processing capability includes one of: identifying a loss of one or more UEs from the one or more neighboring UEs cooperating with the UE for the cooperative UE operations, wherein the loss results in the change to the processing capability; identifying addition of one or more UEs to the one or more neighboring UEs cooperating with the UE for the cooperative UE operations, wherein the addition results in the change to the processing capability; or identifying modification of a UE type of one or more of the neighboring UEs cooperative with the UE for the cooperative UE operations, wherein the modification of the UE type results in the change to the processing capability.

A ninth aspect, based on the first aspect, wherein the cooperative capability report further includes one or more additional associated processing capabilities of which the one or more neighboring UEs of the cooperative UE operation are capable.

A tenth aspect includes any combination of the first aspect through the ninth aspect.

An eleventh aspect configured for wireless communication may include receiving, by a base station, a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode; determining, by the base station, a cooperative mode configuration for the cooperative UE operations based on the identification of the one or more cooperative operation modes and the processing capabilities associated with each cooperative operation mode; and transmitting, by the base station, a cooperative mode configuration to the one or more UEs, wherein the cooperative mode configuration message includes the cooperative mode configuration.

A twelfth aspect, based on the eleventh aspect, wherein the one or more cooperative operation modes includes one or more of: a joint baseband processing mode with one of: IAQ exchange or LLR exchange; and a separate baseband processing mode with one of: separate acknowledgement reporting or combined acknowledgement reporting.

A thirteenth aspect, based on the twelfth aspect, wherein the cooperative capability report further includes baseband processing capabilities for the joint baseband processing mode.

A fourteenth aspect, based on the eleventh aspect, further including: receiving, by the base station, a revised processing capability report from at least one UE of the one or more UEs, wherein the revised processing capability report identifies a change to the processing capability associated with at least one of the one or more cooperative operation modes; transmitting, by the base station, a confirmation message to the at least one UE confirming receipt of the revised processing capability report.

A fifteenth aspect, based on the fourteenth aspect, wherein the receiving the revised processing capability report includes one of: receiving the revised processing capability report in an UCI message; or receiving the revised processing capability report in a MAC-CE.

A sixteenth aspect, based on the fourteenth aspect, further including: determining, by the base station, an updated cooperative mode configuration based on the change to the processing capability; and transmitting, by the base station, an updated cooperative mode configuration message to the one or more UEs, wherein the cooperative mode configuration message includes the updated cooperative mode configuration.

A seventeenth aspect, based on the sixteenth aspect, wherein the cooperative capability report further includes one or more associated additional processing capabilities of which the one or more UEs of the cooperative UE operation are capable, and wherein the determining the cooperative mode configuration for the cooperative UE operations is further based on the one or more additional cooperative operation modes and associated additional processing capabilities.

An eighteenth aspect include any combination of the tenth aspect through the seventeenth aspect.

A nineteenth aspect configured for wireless communication may include means for determining, by a UE configured for cooperative UE operation with one or more neighboring UEs, a processing capability of the UE associated with each cooperative operational mode of one or more cooperative operation modes of which the UE is capable; means for reporting, by the UE, a cooperative capability report to a serving base station, wherein the cooperative capability report includes identification of the one or more cooperative operation mode of which the UE is capable and the processing capability of the UE associated with the each cooperative operation mode; means for receiving, by the UE, a cooperative mode configuration message from the serving base station, wherein the cooperative mode configuration message includes configuration of a cooperative operation mode for the UE; and means for conducting, by the UE, cooperative UE communications using the cooperative operation mode according to the processing capability associated with the cooperative operation mode.

A twentieth aspect, based on the nineteenth aspect, wherein the one or more cooperative operation modes includes one or more of: a joint baseband processing mode with one of: IAQ exchange or LLR exchange; and a separate baseband processing mode with one of: separate acknowledgement reporting or combined acknowledgement reporting.

A twenty-first aspect, based on the twentieth aspect, wherein the cooperative capability report further includes baseband processing capabilities for the joint baseband processing mode.

A twenty-second aspect, based on the nineteenth aspect, wherein the means for determining the processing capability includes one of: means for selecting a predefined processing capability of a plurality of predefined processing capabilities, wherein the predefined processing capability is selected as associated with an identified cooperative operation mode; and means for determining a number of symbols used for processing communications for each supported subcarrier spacing of each of the one or more cooperative operational modes identified in the cooperative capability report.

A twenty-third aspect, based on the twenty-second aspect, wherein the means for determining the number of symbols further includes: means for determining a number of UE-to-UE symbols used for UE-to-UE communication delay, including one or more of: packet encoding time by source UE for target UE, OTA time for UE-to-UE transmission, and packet decoding time by the target UE.

A twenty-fourth aspect, based on the nineteenth aspect, further including: means for detecting, by the UE, a change in the processing capability reported in the cooperative capability report; means for reporting, by the UE, a revised processing capability to the serving base station based on the change detected; and means for receiving, by the UE, a confirmation message from the serving base station, wherein the configuration messages confirms receipt of the revised processing capability by the serving base station.

A twenty-fifth aspect, based on the twenty-fourth aspect, wherein the means for reporting the revised processing capability includes one of: means for reporting the revised processing capability in an UCI message; or means for reporting the revised processing capability in a MAC-CE.

A twenty-sixth aspect, based on the twenty-fourth aspect, wherein the means for detecting the change in the processing capability includes one of: means for identifying a loss of one or more UEs from the one or more neighboring UEs cooperating with the UE for the cooperative UE operations, wherein the loss results in the change to the processing capability; means for identifying addition of one or more UEs to the one or more neighboring UEs cooperating with the UE for the cooperative UE operations, wherein the addition results in the change to the processing capability; and means for identifying modification of a UE type of one or more of the neighboring UEs cooperative with the UE for the cooperative UE operations, wherein the modification of the UE type results in the change to the processing capability.

A twenty-seventh aspect, based on the nineteenth aspect, wherein the cooperative capability report further includes one or more additional associated processing capabilities of which the one or more neighboring UEs of the cooperative UE operation are capable.

A twenty-eighth aspect includes any combination of the nineteenth aspect through the twenty-seventh aspect.

A twenty-ninth aspect configured for wireless communication may include means for receiving, by a base station, a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode; means for determining, by the base station, a cooperative mode configuration for the cooperative UE operations based on the identification of the one or more cooperative operation modes and the processing capabilities associated with each cooperative operation mode; and means for transmitting, by the base station, a cooperative mode configuration to the one or more UEs, wherein the cooperative mode configuration message includes the cooperative mode configuration.

A thirtieth aspect, based on the twenty-ninth aspect, wherein the one or more cooperative operation modes includes one or more of: a joint baseband processing mode with one of: IAQ exchange or LLR exchange; and a separate baseband processing mode with one of: separate acknowledgement reporting or combined acknowledgement reporting.

A thirty-first aspect, based on the thirtieth aspect, wherein the cooperative capability report further includes baseband processing capabilities for the joint baseband processing mode.

A thirty-second aspect, based on the twenty-ninth aspect, further including: means for receiving, by the base station, a revised processing capability report from at least one UE of the one or more UEs, wherein the revised processing capability report identifies a change to the processing capability associated with at least one of the one or more cooperative operation modes; and means for transmitting, by the base station, a confirmation message to the at least one UE confirming receipt of the revised processing capability report.

A thirty-third aspect, based on the thirty-second aspect, wherein the means for receiving the revised processing capability report includes one of: means for receiving the revised processing capability report in an UCI message; or means for receiving the revised processing capability report in a MAC-CE.

A thirty-fourth aspect, based on the thirty-second aspect, further including: means for determining, by the base station, an updated cooperative mode configuration based on the change to the processing capability; and means for transmitting, by the base station, an updated cooperative mode configuration message to the one or more UEs, wherein the cooperative mode configuration message includes the updated cooperative mode configuration.

A thirty-fifth aspect, based on the thirty-fourth aspect, wherein the cooperative capability report further includes one or more associated additional processing capabilities of which the one or more UEs of the cooperative UE operation are capable, and wherein the means for determining the cooperative mode configuration for the cooperative UE operations is further based on the one or more additional cooperative operation modes and associated additional processing capabilities.

A thirty-sixth aspect includes any combination of the twenty-ninth aspect through the thirty-fifth aspect.

A thirty-seventh aspect configured for wireless communication includes a non-transitory computer-readable medium having program code recorded thereon, the program code that may include program code executable by a computer for causing the computer to determine, by a UE configured for cooperative UE operation with one or more neighboring UEs, a processing capability of the UE associated with each cooperative operational mode of one or more cooperative operation modes of which the UE is capable; program code executable by the computer for causing the computer to report, by the UE, a cooperative capability report to a serving base station, wherein the cooperative capability report includes identification of the one or more cooperative operation mode of which the UE is capable and the processing capability of the UE associated with the each cooperative operation mode; program code executable by the computer for causing the computer to receive, by the UE, a cooperative mode configuration message from the serving base station, wherein the cooperative mode configuration message includes configuration of a cooperative operation mode for the UE; and program code executable by the computer for causing the computer to conduct, by the UE, cooperative UE communications using the cooperative operation mode according to the processing capability associated with the cooperative operation mode.

A thirty-eighth aspect based on the thirty-seventh aspect, wherein the one or more cooperative operation modes includes one or more of: a joint baseband processing mode with one of: IAQ exchange or LLR exchange; and a separate baseband processing mode with one of: separate acknowledgement reporting or combined acknowledgement reporting.

A thirty-ninth aspect, based on the thirty-eighth aspect, wherein the cooperative capability report further includes baseband processing capabilities for the joint baseband processing mode.

A fortieth aspect, based on the thirty-seventh aspect, wherein the program code executable by the computer for causing the computer to determine the processing capability includes one of: program code executable by the computer for causing the computer to select a predefined processing capability of a plurality of predefined processing capabilities, wherein the predefined processing capability is selected as associated with an identified cooperative operation mode; and program code executable by the computer for causing the computer to determine a number of symbols used for processing communications for each supported subcarrier spacing of each of the one or more cooperative operational modes identified in the cooperative capability report.

A forty-first aspect, based on the fortieth aspect, wherein the program code executable by the computer for causing the computer to determine the number of symbols further includes:

program code executable by the computer for causing the computer to determine a number of UE-to-UE symbols used for UE-to-UE communication delay, including one or more of: packet encoding time by source UE for target UE, OTA time for UE-to-UE transmission, and packet decoding time by the target UE.

A forty-second aspect, based on the thirty-seventh aspect, further including: program code executable by the computer for causing the computer to detect, by the UE, a change in the processing capability reported in the cooperative capability report; program code executable by the computer for causing the computer to report, by the UE, a revised processing capability to the serving base station based on the change detected; and program code executable by the computer for causing the computer to receive, by the UE, a confirmation message from the serving base station, wherein the configuration messages confirms receipt of the revised processing capability by the serving base station.

A forty-third aspect, based on the forty-second aspect, wherein the program code executable by the computer for causing the computer to report the revised processing capability includes one of: program code executable by the computer for causing the computer to report the revised processing capability in an UCI message; or program code executable by the computer for causing the computer to report the revised processing capability in a MAC-CE.

A forty-fourth aspect, based on the forty-second aspect, wherein the program code executable by the computer for causing the computer to detect the change in the processing capability includes one of: program code executable by the computer for causing the computer to identify a loss of one or more UEs from the one or more neighboring UEs cooperating with the UE for the cooperative UE operations, wherein the loss results in the change to the processing capability; program code executable by the computer for causing the computer to identify addition of one or more UEs to the one or more neighboring UEs cooperating with the UE for the cooperative UE operations, wherein the addition results in the change to the processing capability; or program code executable by the computer for causing the computer to identify modification of a UE type of one or more of the neighboring UEs cooperative with the UE for the cooperative UE operations, wherein the modification of the UE type results in the change to the processing capability.

A forty-fifth aspect, based on the thirty-seventh aspect, wherein the cooperative capability report further includes one or more additional associated processing capabilities of which the one or more neighboring UEs of the cooperative UE operation are capable.

A forty-sixth aspect includes any combination of the thirty-seventh aspect through the forty-fifth aspect.

A forty-seventh aspect configured for wireless communication includes a non-transitory computer-readable medium having program code recorded thereon, the program code may include program code executable by a computer for causing the computer to receive, by a base station, a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode; program code executable by the computer for causing the computer to determine, by the base station, a cooperative mode configuration for the cooperative UE operations based on the identification of the one or more cooperative operation modes and the processing capabilities associated with each cooperative operation mode; and program code executable by the computer for causing the computer to transmit, by the base station, a cooperative mode configuration to the one or more UEs, wherein the cooperative mode configuration message includes the cooperative mode configuration.

A forty-eighth aspect, based on the forty-seventh aspect, wherein the one or more cooperative operation modes includes one or more of: a joint baseband processing mode with one of: IAQ exchange or LLR exchange; and a separate baseband processing mode with one of: separate acknowledgement reporting or combined acknowledgement reporting.

A forty-ninth aspect, based on the forty-eighth aspect, wherein the cooperative capability report further includes baseband processing capabilities for the joint baseband processing mode.

A fiftieth aspect, based on the forty-seventh aspect, further including: program code executable by the computer for causing the computer to receive, by the base station, a revised processing capability report from at least one UE of the one or more UEs, wherein the revised processing capability report identifies a change to the processing capability associated with at least one of the one or more cooperative operation modes; and program code executable by the computer for causing the computer to transmit, by the base station, a confirmation message to the at least one UE confirming receipt of the revised processing capability report.

A fifty-first aspect, based on the fiftieth aspect, wherein the program code executable by the computer for causing the computer to receive the revised processing capability report includes one of: program code executable by the computer for causing the computer to receive the revised processing capability report in an UCI message; or program code executable by the computer for causing the computer to receive the revised processing capability report in a MAC-CE.

A fifty-second aspect, based on the fiftieth aspect, further including: program code executable by the computer for causing the computer to determine, by the base station, an updated cooperative mode configuration based on the change to the processing capability; and program code executable by the computer for causing the computer to transmit, by the base station, an updated cooperative mode configuration message to the one or more UEs, wherein the cooperative mode configuration message includes the updated cooperative mode configuration.

A fifty-third aspect, based on the fifty-second aspect, wherein the cooperative capability report further includes one or more associated additional processing capabilities of which the one or more UEs of the cooperative UE operation are capable, and wherein the program code executable by the computer for causing the computer to determine the cooperative mode configuration for the cooperative UE operations is further based on the one or more additional cooperative operation modes and associated additional processing capabilities.

A fifty-fourth aspect includes any combination of the forty-seventh aspect through the fifty-third aspect.

A fifty-fifth aspect configured for wireless communication may include at least one processor; and a memory coupled to the at least one processor, wherein the at least one processor may be configured to determine, by a UE configured for cooperative UE operation with one or more neighboring UEs, a processing capability of the UE associated with each cooperative operational mode of one or more cooperative operation modes of which the UE is capable; to report, by the UE, a cooperative capability report to a serving base station, wherein the cooperative capability report includes identification of the one or more cooperative operation mode of which the UE is capable and the processing capability of the UE associated with the each cooperative operation mode; to receive, by the UE, a cooperative mode configuration message from the serving base station, wherein the cooperative mode configuration message includes configuration of a cooperative operation mode for the UE; and to conduct, by the UE, cooperative UE communications using the cooperative operation mode according to the processing capability associated with the cooperative operation mode.

A fifty-sixth aspect, based on the fifty-fifth aspect, wherein the one or more cooperative operation modes includes one or more of: a joint baseband processing mode with one of: IAQ exchange or LLR exchange; and a separate baseband processing mode with one of: separate acknowledgement reporting or combined acknowledgement reporting.

A fifty-seventh aspect, based on the fifty-sixth aspect, wherein the cooperative capability report further includes baseband processing capabilities for the joint baseband processing mode.

A fifty-eighth aspect, based on the fifty-sixth aspect, wherein the configuration of the at least one processor to determine the processing capability includes configuration of the at least one processor to one of: select a predefined processing capability of a plurality of predefined processing capabilities, wherein the predefined processing capability is selected as associated with an identified cooperative operation mode; or determine a number of symbols used for processing communications for each supported subcarrier spacing of each of the one or more cooperative operational modes identified in the cooperative capability report.

A fifty-ninth aspect, based on the fifty-eighth aspect, wherein the configuration of the at least one processor to determine the number of symbols further includes configuration of the at least one processor to determine a number of UE-to-UE symbols used for UE-to-UE communication delay, including one or more of: packet encoding time by source UE for target UE, OTA time for UE-to-UE transmission, and packet decoding time by the target UE.

A sixtieth aspect, based on the fifty-fifth aspect, further including configuration of the at least one processor: to detect, by the UE, a change in the processing capability reported in the cooperative capability report; to report, by the UE, a revised processing capability to the serving base station based on the change detected; and to receive, by the UE, a confirmation message from the serving base station, wherein the configuration messages confirms receipt of the revised processing capability by the serving base station.

A sixty-first aspect, based on the sixtieth aspect, wherein the configuration of the at least one processor to report the revised processing capability includes configuration of the at least one processor to one of: report the revised processing capability in an UCI message; or report the revised processing capability in a MAC-CE.

A sixty-second aspect, based on the sixtieth aspect, wherein the configuration of the at least one processor to detect the change in the processing capability includes configuration of the at least one processor to one of: identify a loss of one or more UEs from the one or more neighboring UEs cooperating with the UE for the cooperative UE operations, wherein the loss results in the change to the processing capability; identify addition of one or more UEs to the one or more neighboring UEs cooperating with the UE for the cooperative UE operations, wherein the addition results in the change to the processing capability; or identify modification of a UE type of one or more of the neighboring UEs cooperative with the UE for the cooperative UE operations, wherein the modification of the UE type results in the change to the processing capability.

A sixty-third aspect, based on the fifty-fifth aspect, wherein the cooperative capability report further includes one or more additional associated processing capabilities of which the one or more neighboring UEs of the cooperative UE operation are capable.

A sixty-fourth aspect includes any combination of the fifty-fifth aspect through the sixty-third aspect.

A sixty-fifty aspect configured for wireless communication includes at least one processor; and a memory coupled to the at least one processor, wherein the at least one processor may be configured to receive, by a base station, a cooperative capability report from one or more UEs configured for cooperative UE operations, wherein the cooperative capability report includes identification of one or more cooperative operation modes of which the one or more UEs are capable and the processing capability of the one or more UEs associated with each cooperative operation mode; to determine, by the base station, a cooperative mode configuration for the cooperative UE operations based on the identification of the one or more cooperative operation modes and the processing capabilities associated with each cooperative operation mode; and to transmit, by the base station, a cooperative mode configuration to the one or more UEs, wherein the cooperative mode configuration message includes the cooperative mode configuration.

A sixty-sixth aspect, based on the sixty-fifth aspect, wherein the one or more cooperative operation modes includes one or more of: a joint baseband processing mode with one of: IAQ exchange or LLR exchange; and a separate baseband processing mode with one of: separate acknowledgement reporting or combined acknowledgement reporting.

A sixty-seventh aspect, based on the sixty-sixth aspect, wherein the cooperative capability report further includes baseband processing capabilities for the joint baseband processing mode.

A sixty-eighth aspect, based on the sixty-fifth aspect, further including configuration of the at least one processor: to receive, by the base station, a revised processing capability report from at least one UE of the one or more UEs, wherein the revised processing capability report identifies a change to the processing capability associated with at least one of the one or more cooperative operation modes; and to transmit, by the base station, a confirmation message to the at least one UE confirming receipt of the revised processing capability report.

A sixty-ninth aspect, based on the sixty-eight aspect, wherein the configuration of the at least one processor to receive the revised processing capability report includes configuration of the at least one processor to one of: receive the revised processing capability report in an UCI message; or receive the revised processing capability report in a MAC-CE.

A seventieth aspect, based on the sixty-eighth aspect, further including configuration of the at least one processor: to determine, by the base station, an updated cooperative mode configuration based on the change to the processing capability; and to transmit, by the base station, an updated cooperative mode configuration message to the one or more UEs, wherein the cooperative mode configuration message includes the updated cooperative mode configuration.

A seventy-first aspect, based on the seventieth aspect, wherein the cooperative capability report further includes one or more associated additional processing capabilities of which the one or more UEs of the cooperative UE operation are capable, and wherein the configuration of the at least one processor to determine the cooperative mode configuration for the cooperative UE operations is further based on the one or more additional cooperative operation modes and associated additional processing capabilities.

A seventy-second aspect includes any combination of the sixty-fifth aspect through the seventy-first aspect.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a user equipment (UE) configured for cooperative UE operation with one or more neighboring UEs, a processing capability of the UE associated with each cooperative operation mode of one or more cooperative operation modes of which the UE is capable, the determining the processing capability includes one of: selecting a predefined processing capability of a plurality of predefined processing capabilities wherein the predefined processing capability is selected as associated with an identified cooperative operation mode, or determining a number of symbols used for processing communications for each supported subcarrier spacing of each of the one or more cooperative operation modes identified in a cooperative capability report;
   reporting, by the UE, the cooperative capability report to a serving base station, wherein the cooperative capability report includes identification of the one or more cooperative operation modes of which the UE is capable and the processing capability of the UE associated with the each cooperative operation mode;

receiving, by the UE, a cooperative mode configuration message from the serving base station, wherein the cooperative mode configuration message includes configuration of a cooperative operation mode for the UE; and conducting, by the UE, cooperative UE communications using the cooperative operation mode according to the processing capability associated with the cooperative operation mode.

2. The method of claim 1, wherein the one or more cooperative operation modes includes one or more of:

a joint baseband processing mode with one of: in-phase and quadrature (IAQ) exchange or log-likelihood ratio (LLR) exchange; or a separate baseband processing mode with one of: separate acknowledgement reporting or combined acknowledgement reporting.

3. The method of claim 1, wherein the cooperative capability report further includes baseband processing capabilities for a joint baseband processing mode.

4. The method of claim 1, wherein the determining the number of symbols further includes:

determining a number of UE-to-UE symbols used for UE-to-UE communication delay, including one or more of: packet encoding time by source UE for target UE, over-the-air (OTA) time for UE-to-UE transmission, or packet decoding time by the target UE.

5. The method of claim 1, further including:

detecting, by the UE, a change in the processing capability reported in the cooperative capability report;

reporting, by the UE, a revised processing capability to the serving base station based on the change detected; and receiving, by the UE, a confirmation message from the serving base station, wherein the configuration message confirms receipt of the revised processing capability by the serving base station.

6. The method of claim 5, wherein the reporting the revised processing capability includes one of:

reporting the revised processing capability in an uplink control information (UCI) message; or reporting the revised processing capability in a medium access control-control element (MAC-CE).

7. The method of claim 5, wherein the detecting the change in the processing capability includes one of:

identifying a loss of one or more UEs from the one or more neighboring UEs cooperating with the UE for the cooperative UE operations, wherein the loss results in the change to the processing capability;

identifying addition of one or more UEs to the one or more neighboring UEs cooperating with the UE for the cooperative UE operations, wherein the addition results in the change to the processing capability; and identifying modification of a type of a UE one or more of the neighboring UEs cooperative with the UE for the cooperative UE operations, wherein the modification of the type of the UE results in the change to the processing capability.

8. The method of claim 1, wherein the cooperative capability report further includes one or more additional associated processing capabilities of which the one or more neighboring UEs of the cooperative UE operation are capable.

9. A method of wireless communication, comprising:

receiving, by a base station, a cooperative capability report from one or more user equipments (UEs) configured for cooperative UE operations, wherein the cooperative capability report includes identification of one or more cooperative operation modes of which the one or more UEs are capable and processing capability of the one or more UEs associated with each cooperative operation mode, wherein determination of the processing capability includes one of: selection of a predefined processing capability of a plurality of predefined processing capabilities wherein the predefined processing capability is selected as associated with an identified cooperative operation mode, or determination of a number of symbols used for processing communications for each supported subcarrier spacing of each of the one or more cooperative operation modes identified in the cooperative capability report;

determining, by the base station, a cooperative mode configuration for the cooperative UE operations based on the identification of the one or more cooperative operation modes and the processing capability associated with each cooperative operation mode; and transmitting, by the base station, a cooperative mode configuration message to the one or more UEs, wherein the cooperative mode configuration message includes the cooperative mode configuration.

10. The method of claim 9, wherein the one or more cooperative operation modes includes one or more of:

a joint baseband processing mode with one of: in-phase and quadrature (IAQ) exchange or log-likelihood ratio (LLR) exchange; or a separate baseband processing mode with one of: separate acknowledgement reporting or combined acknowledgement reporting.

11. The method of claim 10, wherein the cooperative capability report further includes baseband processing capabilities for the joint baseband processing mode.

12. The method of claim 9, further including:

receiving, by the base station, a revised processing capability report from at least one UE of the one or more UEs, wherein the revised processing capability report identifies a change to the processing capability associated with at least one of the one or more cooperative operation modes; and transmitting, by the base station, a confirmation message to the at least one UE confirming receipt of the revised processing capability report.

13. The method of claim 12, wherein the receiving the revised processing capability report includes one of:

receiving the revised processing capability report in an uplink control information (UCI) message; or receiving the revised processing capability report in a medium access control-control element (MAC-CE).

14. The method of claim 12, further including:

determining, by the base station, an updated cooperative mode configuration based on the change to the processing capability; and transmitting, by the base station, an updated cooperative mode configuration message to the one or more UEs, wherein the updated cooperative mode configuration message includes the updated cooperative mode configuration.

15. The method of claim 14, wherein the cooperative capability report further includes one or more additional cooperative operation modes and one or more associated additional processing capabilities of which the one or more UEs of the cooperative UE operation are capable, and wherein the determining the cooperative mode configuration for the cooperative UE operations is further based on the one or more additional cooperative operation modes and associated additional processing capabilities.

16. An apparatus configured for wireless communication, the apparatus comprising:

at least one processor; and a memory coupled to the at least one processor, wherein the at least one processor is configured:

to determine, by a user equipment (UE) configured for cooperative UE operation with one or more neighboring UEs, a processing capability of the UE associated with each cooperative operation mode of one or more cooperative operation modes of which the UE is capable, wherein the configuration of the at least one processor to determine the processing capability includes one of: select a predefined processing capability of a plurality of predefined processing capabilities wherein the predefined processing capability is selected as associated with an identified cooperative operation mode, or determine a number of symbols used for processing communications for each supported subcarrier spacing of each of the one or more cooperative operation modes identified in a cooperative capability report;

to report, by the UE, the cooperative capability report to a serving base station, wherein the cooperative capability report includes identification of the one or more cooperative operation mode of which the UE is capable and the processing capability of the UE associated with the each cooperative operation mode;

to receive, by the UE, a cooperative mode configuration message from the serving base station, wherein the cooperative mode configuration message includes configuration of a cooperative operation mode for the UE; and to conduct, by the UE, cooperative UE communications using the cooperative operation mode according to the processing capability associated with the cooperative operation mode.

17. The apparatus of claim 16, wherein the one or more cooperative operation modes includes one or more of:

a joint baseband processing mode with one of: in-phase and quadrature (IAQ) exchange or log-likelihood ratio (LLR) exchange; or a separate baseband processing mode with one of: separate acknowledgement reporting or combined acknowledgement reporting.

18. The apparatus of claim 17, wherein the cooperative capability report further includes baseband processing capabilities for the joint baseband processing mode.

19. The apparatus of claim 16, wherein the configuration of the at least one processor to determine the number of symbols further includes configuration of the at least one processor to determine a number of UE-to-UE symbols used for UE-to-UE communication delay, including one or more of: packet encoding time by source UE for target UE, over-the-air (OTA) time for UE-to-UE transmission, or packet decoding time by the target UE.

20. The apparatus of claim 16, further including configuration of the at least one processor:

to detect, by the UE, a change in the processing capability reported in the cooperative capability report;

to report, by the UE, a revised processing capability to the serving base station based on the change detected; and to receive, by the UE, a confirmation message from the serving base station, wherein the configuration message confirms receipt of the revised processing capability by the serving base station.

21. The apparatus of claim 20, wherein the configuration of the at least one processor to report the revised processing capability includes configuration of the at least one processor to one of:

report the revised processing capability in an uplink control information (UCI) message; or report the revised processing capability in a medium access control-control element (MAC-CE).

22. The apparatus of claim 20, wherein the configuration of the at least one processor to detect the change in the processing capability includes configuration of the at least one processor to one of:

identify a loss of one or more UEs from the one or more neighboring UEs cooperating with the UE for the cooperative UE operations, wherein the loss results in the change to the processing capability;

identify addition of one or more UEs to the one or more neighboring UEs cooperating with the UE for the cooperative UE operations, wherein the addition results in the change to the processing capability; and identify modification of a type of a UE one or more of the neighboring UEs cooperative with the UE for the cooperative UE operations, wherein the modification of the type of the UE results in the change to the processing capability.

23. The apparatus of claim 16, wherein the cooperative capability report further includes one or more additional associated processing capabilities of which the one or more neighboring UEs of the cooperative UE operation are capable.

24. An apparatus configured for wireless communication, the apparatus comprising:

at least one processor; and a memory coupled to the at least one processor, wherein the at least one processor is configured:

to receive, by a base station, a cooperative capability report from one or more user equipments (UEs) configured for cooperative UE operations, wherein the cooperative capability report includes identification of one or more cooperative operation modes of which the one or more UEs are capable and processing capability of the one or more UEs associated with each cooperative operation mode, wherein determination of the processing capability includes one of: selection of a predefined processing capability of a plurality of predefined processing capabilities wherein the predefined processing capability is selected as associated with an identified cooperative operation mode, or determination of a number of symbols used for processing communications for each supported subcarrier spacing of each of the one or more cooperative operation modes identified in the cooperative capability report;

to determine, by the base station, a cooperative mode configuration for the cooperative UE operations based on the identification of the one or more cooperative operation modes and the processing capabilities associated with each cooperative operation mode; and to transmit, by the base station, a cooperative mode configuration message to the one or more UEs, wherein the cooperative mode configuration message includes the cooperative mode configuration.

25. The apparatus of claim 24, wherein the one or more cooperative operation modes includes one or more of:

a joint baseband processing mode with one of: in-phase and quadrature (IAQ) exchange or log-likelihood ratio (LLR) exchange; or a separate baseband processing mode with one of: separate acknowledgement reporting or combined acknowledgement reporting.

26. The apparatus of claim 25, wherein the cooperative capability report further includes baseband processing capabilities for the joint baseband processing mode.

27. The apparatus of claim 24, further including configuration of the at least one processor:

to receive, by the base station, a revised processing capability report from at least one UE of the one or more UEs, wherein the revised processing capability report identifies a change to the processing capability associated with at least one of the one or more cooperative operation modes; and to transmit, by the base station, a confirmation message to the at least one UE confirming receipt of the revised processing capability report.

28. The apparatus of claim 27, wherein the configuration of the at least one processor to receive the revised processing capability report includes configuration of the at least one processor to one of:

receive the revised processing capability report in an uplink control information (UCI) message; or receive the revised processing capability report in a medium access control-control element (MAC-CE).

29. The apparatus of claim 27, further including configuration of the at least one processor:

to determine, by the base station, an updated cooperative mode configuration based on the change to the processing capability; and to transmit, by the base station, an updated cooperative mode configuration message to the one or more UEs, wherein the updated cooperative mode configuration message includes the updated cooperative mode configuration.

30. The apparatus of claim 29, wherein the cooperative capability report further includes one or more additional cooperative operation modes and one or more associated additional processing capabilities of which the one or more UEs of the cooperative UE operation are capable, and wherein the configuration of the at least one processor to determine the cooperative mode configuration for the cooperative UE operations is further based on the one or more additional cooperative operation modes and associated additional processing capabilities.

* * * * *